US010995272B2

(12) United States Patent
Hara et al.

(10) Patent No.: US 10,995,272 B2
(45) Date of Patent: May 4, 2021

(54) PELLET MIXTURE AND INJECTION MOLDED PRODUCT

(71) Applicant: SUMITOMO CHEMICAL COMPANY, LIMITED, Tokyo (JP)

(72) Inventors: Tomoyuki Hara, Tokyo (JP); Takayuki Sugiyama, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/743,646

(22) Filed: Jan. 15, 2020

(65) Prior Publication Data
US 2020/0362246 A1    Nov. 19, 2020

(30) Foreign Application Priority Data

May 17, 2019    (JP) ............................. JP2019-093682

(51) Int. Cl.
| | | |
|---|---|---|
| *C09K 19/52* | (2006.01) | |
| *C09K 19/38* | (2006.01) | |
| *B29C 45/00* | (2006.01) | |
| B29K 67/00 | (2006.01) | |
| B29K 105/00 | (2006.01) | |
| B29K 105/16 | (2006.01) | |

(52) U.S. Cl.
CPC ...... *C09K 19/3809* (2013.01); *B29C 45/0001* (2013.01); *B29C 2791/002* (2013.01); *B29K 2067/00* (2013.01); *B29K 2105/0079* (2013.01); *B29K 2105/16* (2013.01); *B29K 2105/251* (2013.01)

(58) Field of Classification Search
CPC ................ C09K 19/3809; C09K 19/52; C09K 2019/521
USPC ..................................................... 252/299.01
See application file for complete search history.

(56) References Cited

U.S. PATENT DOCUMENTS

| | | | |
|---|---|---|---|
| 9,994,771 B2 * | 6/2018 | Hegi ................. | B29B 7/90 |
| 2003/0001139 A1 | 1/2003 | Nagano et al. | |
| 2012/0022202 A1 | 1/2012 | Suh et al. | |
| 2016/0122533 A1 | 5/2016 | Tomita et al. | |
| 2020/0048553 A1 | 2/2020 | Hu et al. | |

FOREIGN PATENT DOCUMENTS

| | | |
|---|---|---|
| CN | 1377937 A | 11/2002 |
| CN | 102388101 A | 3/2012 |
| CN | 102596524 A | 7/2012 |
| CN | 105431488 A | 3/2016 |
| JP | 08-192421 A | 7/1996 |
| JP | 10-139885 A | 5/1998 |
| JP | 10-182839 A | 7/1998 |
| JP | 11-309715 A | 11/1999 |
| JP | 2003-064266 A | 3/2003 |
| JP | 2004-351860 A | 12/2004 |
| JP | 2013-177007 A | 9/2013 |
| JP | 2016-014137 A | 1/2016 |
| KR | 10-2015-0072965 A | 6/2015 |
| TW | 201829582 A | 8/2018 |
| WO | 2010/067561 A1 | 6/2010 |

OTHER PUBLICATIONS

Japanese Office Action Decision to Grant a Patent issued in corresponding Japanese Patent Application No. 2019-093682, dated Oct. 29, 2019, with English translation.

Database WPI Week 201547, Thomson Scientific, London, GB; AN 2015-38741N XP002799145, & KR 2015 0072965 A (Samsung Fine Chem Co Ltd), Jun. 30, 2015 (Jun. 30, 2015).

Database WPI Week 201042, Thomson Scientific, London, GB; AN 2010-G96074 XP002799146, & WO 2010/067561 AI (Polyplastics KK), Jun. 17, 2010 (Jun. 17, 2010).

Extended European Search Report issued in corresponding European Patent Application No. 20152166.3, dated Jun. 29, 2020.

Japanese Notice of Reasons for Rejection issued in corresponding Japanese Patent Application No. 2019-093682, dated Jul. 16, 2019, with English translation.

Chinese Office Action issued in corresponding Chinese Patent Application No. 202010056957.3, dated Jul. 24, 2020, with English translation.

India Office Action issued in corresponding India Patent Application No. 202044001952, dated Jan. 19, 2021, with English translation.

* cited by examiner

Primary Examiner — Geraldina Visconti
(74) Attorney, Agent, or Firm — McDermott Will & Emery LLP

(57) ABSTRACT

The present invention relates to a pellet mixture including a pellet of a liquid crystal polyester resin composition which contains a liquid crystal polyester resin and an inorganic filler, and a fine powder formed of an organic material, in which a volume average particle diameter of the fine powder is in a range of 10 μm to 200 μm, and an amount of the fine powder is in a range of 10 ppm to 2000 ppm with respect to the total mass of the pellet mixture.

10 Claims, No Drawings

PELLET MIXTURE AND INJECTION MOLDED PRODUCT

BACKGROUND OF THE INVENTION

Field of the Invention

The present invention relates to a pellet mixture and an injection molded product.

Priority is claimed on Japanese Patent Application No. 2019-093682, filed on May 17, 2019, the content of which is incorporated herein by reference.

Description of Related Art

A liquid crystal polyester is typically referred to as a molten liquid crystal (thermotropic liquid crystal) polymer. Due to the unique behavior, the liquid crystal polyester has remarkably excellent melt fluidity and sometimes has heat distortion resistance of 300° C. or higher depending on the structure thereof. The liquid crystal polyester is used in molded products for applications such as electronic components, automobile components, OA components, heat-resistant tableware, and the like by using excellent fluidity and heat resistance thereof. In recent years, with a tendency of reduction in size and thickness of electronic devices, reduction in size and thickness of electronic components such as connectors is significant, and a liquid crystal polyester is widely employed.

In recent years, in injection molded products obtained by using a liquid crystal polyester resin pellet, continuous molding is carried out for a long period of time under a condition in which the molding cycle is shortened for the purpose of improving the productivity in some cases. In such continuous molding of a liquid crystal polyester resin, it is important that the stability of the measuring time (also referred to as the plasticization time) during the injection molding is high. In a case where the measuring time during molding varies, there is a problem in that the dimension and the appearance of the molded product are affected.

For such a problem, Japanese Unexamined Patent Application, First Publication No. 2013-177007 describes a pellet from which burrs have been removed in order to stabilize the measuring time during molding of a molded product.

SUMMARY OF THE INVENTION

However, the liquid crystal polyester resin pellet is required to further improve the measurement stability during molding in order to shorten the production time.

Further, in a case where plasticization of the pellet is unstable as described above, the thermal history of the resin changes and thus the color tone of a molded product to be obtained becomes worse.

In the present specification, the "measurement stability" is evaluated based on the measuring time during molding and variation in the measuring time. Further, the expression "the measurement stability is excellent" indicates that the measuring time of the pellet is short and variation in the measuring time is small.

The present invention has been made in consideration of the above-described circumstances, and an object thereof is to provide a pellet mixture which has excellent measurement stability and from which a molded product with an excellent color tone is obtained and an injection molded product.

In order to solve the above-described problems, according to an aspect of the present invention, there is provided a pellet mixture including: a pellet of a liquid crystal polyester resin composition which contains a liquid crystal polyester resin and an inorganic filler; and a fine powder formed of an organic material, in which a volume average particle diameter of the fine powder is in a range of 10 μm to 200 μm, and the amount of the fine powder is in a range of 10 ppm to 2000 ppm with respect to the total mass of the pellet mixture.

In the aspect of the present invention, the volume average particle diameter of the fine powder may be in a range of 30 μm to 150 μm.

In the aspect of the present invention, the organic material may contain a liquid crystal polyester resin and at least one selected from the group consisting of glass fibers, talc, and mica.

In the aspect of the present invention, the organic material may be the liquid crystal polyester resin composition.

In the aspect of the present invention, the inorganic filler may be at least one selected from the group consisting of glass fibers, talc, and mica.

In the aspect of the present invention, the amount of the fine powder may be in a range of 10 ppm to 1000 ppm with respect to the total mass of the pellet mixture.

In the aspect of the present invention, the pellet mixture may include a higher fatty acid metal salt in a range of 20 ppm to 1000 ppm with respect to a total mass of the liquid crystal polyester resin and the inorganic filler.

In the aspect of the present invention, the amount of the inorganic filler may be in a range of 5 parts by mass to 100 parts by mass with respect to 100 parts by mass of the liquid crystal polyester resin.

In the aspect of the present invention, the length of the pellet may be in a range of 2 mm to 4 mm, a major axis of the pellet may be in a range of 2 mm to 4 mm, and a minor axis of the pellet may be in a range of 2 mm to 3 mm.

According to another aspect of the present invention, there is provided an injection molded product formed from the pellet mixture as a forming material.

According to the aspect of the present invention, it is possible to provide a pellet mixture which has excellent measurement stability and from which a molded product with an excellent color tone is obtained and an injection molded product.

DETAILED DESCRIPTION OF THE INVENTION

<Pellet Mixture>

A pellet mixture according to the present embodiment contains a pellet of a liquid crystal polyester resin composition containing a liquid crystal polyester resin and an inorganic filler, and a fine powder formed of an organic material.

In the embodiment of the present invention, the amount of the liquid crystal polyester resin is in a range of 50% by mass to 95% by mass, preferably in a range of 55% by mass to 85% by mass, and still more preferably in a range of 50% by mass to 75% by mass with respect to the total mass of the pellet mixture.

Hereinafter, the pellet of the liquid crystal polyester resin composition will also be simply referred to as the "pellet".

The pellet mixture according to the present embodiment is a molding material used for production of a molded product.

In the present specification, the "liquid crystal polyester resin composition" indicates a material obtained after the liquid crystal polyester resin and the inorganic filler are melt-kneaded.

<<Pellet>>

The length and the shape of the pellet according to the present embodiment are not particularly limited and arbitrarily selected depending on the purpose thereof.

The length of the pellet is preferably in a range of 2 mm to 4 mm and more preferably in a range of 2.5 mm to 4 mm.

The pellet according to the present embodiment is obtained by, for example, extruding the liquid crystal polyester resin composition in the form of a strand from an extruder or the like and cutting the strand using a cutter having a rotary blade.

Examples of the shape of the pellet include a spherical shape, a strip shape, a spheroidal shape, and a cylindrical shape which is somewhat deformed from an exact spheroidal shape. Among these, as the shape of the pellet, a columnar pellet whose cross section has a substantially elliptical shape is preferable.

In the pellet according to the present embodiment, the major axis of the cross section of the pellet is not particularly limited, but is preferably in a range of 1 mm to 5 mm, more preferably in a range of 2 mm to 4 mm, and still more preferably in a range of 2 mm to 3.5 mm.

In the pellet according to the present embodiment, the minor axis of the cross section of the pellet is not particularly limited, but is preferably in a range of 1 mm to 3 mm and more preferably in a range of 2 mm to 3 mm.

Further, the ratio between the major axis and the minor axis (major axis/minor axis) of the cross section of the pellet is not particularly limited, but is preferably in a range of 1 to 4.

In the present specification, the major axis and the minor axis of the cross section of the pellet are also simply referred to as the major axis and the minor axis of the pellet.

In the present specification, the "major axis of the pellet" indicates the length shown as a minor axis of a rectangle circumscribing a projected image of the front surface of the pellet.

In the cross section of the pellet of the present specification, the "minor axis of the pellet" indicates the length shown as a straight line which is perpendicular to the major axis and connects the two most distant points on the outer periphery of the cross section of the pellet.

The major axis and the minor axis of the pellet can be controlled by adjusting the diameter of a nozzle of an extruder or the like and changing the diameter of a strand.

In the pellet according to the present embodiment, a pellet having a length of 2 mm to 4 mm, a major axis of 2 mm to 4 mm, and a minor axis of 2 mm to 3 mm is particularly preferable.

Hereinafter, each component of the liquid crystal polyester resin composition used in the present embodiment will be described.

[Liquid Crystal Polyester Resin]

An embodiment of the liquid crystal polyester resin used in the present embodiment will be described.

The liquid crystal polyester resin used in the present embodiment is a polyester showing a liquid crystal in a melted state, and it is preferable that the liquid crystal polyester resin is melted at a temperature of 450° C. or lower. Further, the liquid crystal polyester resin may be a liquid crystal polyester amide, a liquid crystal polyester ether, a liquid crystal polyester carbonate, or a liquid crystal polyester imide. It is preferable that the liquid crystal polyester resin is a wholly aromatic liquid crystal polyester resin formed by polymerizing only an aromatic compound as a raw material monomer.

Typical examples of the liquid crystal polyester used in the present invention include a polymer obtained by condensing and polymerizing (polycondensing) an aromatic hydroxycarboxylic acid, an aromatic dicarboxylic acid, and at least one compound selected from the group consisting of an aromatic diol, an aromatic hydroxyamine and an aromatic diamine; a polymer obtained by polymerizing a plurality of aromatic hydroxycarboxylic acids; a polymer obtained by polymerizing an aromatic dicarboxylic acid, and at least one compound selected from the group consisting of an aromatic diol, an aromatic hydroxyamine and an aromatic diamine; and a polymer obtained by polymerizing a polyester such as polyethylene terephthalate and an aromatic hydroxycarboxylic acid.

Among these, a polymer obtained by condensing and polymerizing (polycondensing) an aromatic hydroxycarboxylic acid, an aromatic dicarboxylic acid, and at least one compound selected from the group consisting of an aromatic diol, an aromatic hydroxyamine and an aromatic diamine is preferable.

Here, the aromatic hydroxycarboxylic acid, the aromatic dicarboxylic acid, the aromatic diol, the aromatic hydroxyamine, and the aromatic diamine may each independently be a polymerizable ester-forming derivative in place of a part or all thereof.

Examples of the polymerizable derivative of a compound containing a carboxy group such as an aromatic hydroxycarboxylic acid or an aromatic dicarboxylic acid include an ester, an acid halide, and an acid anhydride. Examples of the ester include a compound obtained by converting a carboxy group to an alkoxycarbonyl group or an aryloxycarbonyl group. Examples of the acid halide include a compound obtained by converting a carboxy group to a haloformyl group. Examples of the acid anhydride include a compound obtained by converting a carboxy group to an acyloxycarbonyl group.

Examples of the polymerizable derivative of a compound containing a hydroxy group such as an aromatic hydroxycarboxylic acid, an aromatic diol, or an aromatic hydroxyamine include a compound (acylated compound) obtained by converting a hydroxy group to an acyloxy group through acylation.

Examples of the polymerizable derivative of a compound containing an amino group such as an aromatic hydroxyamine or an aromatic diamine include a compound (acylated compound) obtained by converting an amino group to an acylamino group through acylation.

Among the examples of the polymerizable derivatives, as the raw material monomer of the liquid crystal polyester, an acylated compound obtained by acylating an aromatic hydroxycarboxylic acid or an aromatic diol is preferable.

It is preferable that the liquid crystal polyester according to the present invention has a repeating unit represented by Formula (1) (hereinafter, also referred to as a "repeating unit (1)") and more preferable that the liquid crystal polyester has the repeating unit (1), a repeating unit represented by Formula (2) (hereinafter, also referred to as a "repeating unit (2)"), and a repeating unit represented by Formula (3) (hereinafter, also referred to as a "repeating unit (3)").

—O—Ar¹—CO—　　(1)

—CO—Ar²—CO—　　(2)

—X—Ar³—Y—　　(3)

wherein Formulae (1) to (3), $Ar^1$ represents a phenylene group, a naphthylene group, or a biphenylylene group;

Ar² and Ar³ each independently represent a phenylene group, a naphthylene group, a biphenylylene group, or a group represented by Formula (4);

X and Y each independently represent an oxygen atom or an imino group (—NH—); and one or more hydrogen atoms in the group represented by Ar¹, Ar², or Ar³ may each independently be substituted with a halogen atom, an alkyl group having 1 to 10 carbon atoms, or an aryl group having 6 to 20 carbon atoms.

—Ar⁴—Z—Ar⁵—    (4)

wherein Formula (4), Ar⁴ and Ar⁵ each independently represent a phenylene group or a naphthylene group;

Z represents an oxygen atom, a sulfur atom, a carbonyl group, a sulfonyl group, or an alkylidene group having 1 to 10 carbon atoms; and one or more hydrogen atoms in the group represented by Ar⁴ or Ar⁵ may each independently be substituted with a halogen atom, an alkyl group having 1 to 10 carbon atoms, or an aryl group having 6 to 20 carbon atoms.

Examples of the halogen atom which can be substituted with a hydrogen atom include a fluorine atom, a chlorine atom, a bromine atom, and an iodine atom.

Examples of the alkyl group having 1 to 10 carbon atoms which can be substituted with a hydrogen atom include a methyl group, an ethyl group, a 1-propyl group, an isopropyl group, a 1-butyl group, an isobutyl group, a sec-butyl group, a tert-butyl group, a 1-hexyl group, a 2-ethylhexyl group, a 1-octyl group, and a 1-decyl group.

Examples of the aryl group having 6 to 20 carbon atoms which can be substituted with a hydrogen atom include a monocyclic aromatic group such as a phenyl group, an orthotolyl group, a methatolyl group, or a paratolyl group; and a condensed aromatic group such as a 1-naphthyl group or a 2-naphthyl group.

In a case where one or more hydrogen atoms in the group represented by Ar¹, Ar², Ar³, Ar⁴, or Ar⁵ are substituted with the halogen atom, the alkyl group having 1 to 10 carbon atoms, or the aryl group having 6 to 20 carbon atoms, the numbers of groups substituting the hydrogen atoms are each independently preferably 1 or 2 and more preferably 1 for each group represented by Ar¹, Ar², Ar³, AR⁴, and Ar⁵.

Examples of the alkylidene group having 1 to 10 carbon atoms include a methylene group, an ethylidene group, an isopropylidene group, a 1-butylidene group, and a 2-ethylhexylidene group.

The repeating unit (1) is a repeating unit derived from a predetermined aromatic hydroxycarboxylic acid.

Examples of the aromatic hydroxycarboxylic acid include parahydroxybenzoic acid, metahydroxybenzoic acid, 2-hydroxy-6-naphthoic acid, 2-hydroxy-3-naphthoic acid, 1-hydroxy-5-naphthoic acid, 4-hydroxy-4'-carboxydiphenylether, and aromatic hydroxycarboxylic acids in which some hydrogen atoms in aromatic rings of these aromatic hydroxycarboxylic acids are substituted with substituents selected from the group consisting of an alkyl group, an aryl group, and a halogen atom. The aromatic hydroxycarboxylic acid may be used alone or in combination of two or more kinds thereof in production of the liquid crystal polyester.

As the repeating unit (1), a repeating unit in which Ar¹ represents a 1,4-phenylene group (a repeating unit derived from parahydroxybenzoic acid) or a repeating unit in which Ar¹ represents a 2,6-naphthylene group (a repeating unit derived from 6-hydroxy-2-naphthoic acid) is preferable.

The repeating unit (2) is a repeating unit derived from a predetermined aromatic dicarboxylic acid.

Examples of the aromatic dicarboxylic acid include terephthalic acid, isophthalic acid, biphenyl-4,4'-dicarboxylic acid, 2,6-naphthalenedicarboxylic acid, diphenyl ether-4,4'-dicarboxylic acid, diphenyl thioehter-4,4'-dicarboxylic acid, and aromatic dicarboxylic acids in which some hydrogen atoms in aromatic rings of these aromatic dicarboxylic acids are substituted with substituents selected from the group consisting of an alkyl group, an aryl group, and a halogen atom.

The aromatic dicarboxylic acid may be used alone or in combination of two or more kinds thereof in production of the liquid crystal polyester.

As the repeating unit (2), a repeating unit in which Ar² represents a 1,4-phenylene group (such as a repeating unit derived from terephthalic acid), a repeating unit in which Ar² represents a 1,3-phenylene group (such as a repeating unit derived from isophthalic acid), a repeating unit in which Ar² represents a 2,6-naphthylene group (such as a repeating unit derived from 2,6-naphthalenedicarboxylic acid), or a repeating unit in which Ar² represents a diphenyl ether-4,4'-diyl group (such as a repeating unit derived from diphenyl ether-4,4'-dicarboxylic acid) is preferable.

The repeating unit (3) is a repeating unit derived from a predetermined aromatic diol, an aromatic hydroxyamine, and an aromatic diamine.

Examples of the aromatic diol include 4,4'-dihydroxybiphenyl, hydroquinone, resorcin, 4,4'-dihydroxydiphenyl ketone, 4,4'-dihydroxydiphenyl ether, bis(4-hydroxyphenyl)methane, 1,2-bis(4-hydroxyphenyl) ethane, 4,4'-dihydroxydiphenyl sulfone, 4,4'-dihydroxydiphenyl thioether, 2,6-dihydroxynaphthalene, and 1,5-dihydroxynaphthalene.

Examples of the aromatic hydroxyamine include 4-aminophenol and 4-amino-4'-hydroxybiphenyl.

Examples of the aromatic diamine include 1,4-phenylenediamine and 4,4'-diaminobiphenyl.

The aromatic diol, the aromatic hydroxyamine, or the aromatic diamine may be used alone or in combination of two or more kind thereof in the production of the liquid crystal polyester.

As the repeating unit (3), a repeating unit in which Ar³ represents a 1,4-phenylene group (such as a repeating unit derived from hydroquinone, 4-aminophenol, or 1,4-phenylenediamine) or a repeating unit in which Ar³ represents a 4,4'-biphenylylene group (such as a repeating unit derived from 4,4'-dihydroxybiphenyl, 4-amino-4'-hydroxybiphenyl, or 4,4'-diaminobiphenyl) is preferable.

In the present specification, the term "derived" indicates that the chemical structure is changed for polymerization of a raw material monomer and other structures are not changed.

Further, in a case where a molded product to be obtained from the liquid crystal polyester resin composition of the present invention is required to have particularly excellent heat resistance (solder resistance), it is preferable that the number of substituents with degraded heat resistance is small, and it is also preferable that the composition does not have a particular substituent such as an alkyl group.

Next, combinations of structural units for a particularly suitable liquid crystal polyester in application to the present invention will be described based on the structural units exemplified above.

Specific preferred examples of the liquid crystal polymer used in the present invention include those formed of the following monomer structural units.

1) 4-Hydroxybenozic acid/2-hydroxy-6-naphthoic acid copolymer 2) 4-Hydroxybenzoic acid/terephthalic acid/4,4'-dihydroxybiphenyl copolymer 3) 4-Hydroxybenzoic acid/terephthalic acid/isophthalic acid/4,4'-dihydroxybiphenyl copolymer 4) 4-Hydroxybenzoic acid/terephthalic acid/isophthalic acid/4,4'-dihydroxybiphenyl/hydroquinone copolymer 5) 4-Hydroxybenzoic acid/terephthalic acid/hydroquinone copolymer 6) 2-Hydroxy-6-naphthoic acid/terephthalic acid/hydroquinone copolymer 7) 4-Hydroxybenzoic acid/2-hydroxy-6-naphthoic acid/terephthalic acid/4,4'-dihydroxybiphenyl copolymer 8) 2-Hydroxy-6-naphthoic acid/terephthalic acid/4,4'-dihydroxybiphenyl copolymer 9) 4-Hydroxybenzoic acid/2-hydroxy-6-naphthoic acid/terephthalic acid/hydroxyquinone copolymer 10) 4-Hydroxybenzoic acid/2-hydroxy-6-naphthoic acid/terephthalic acid/hydroquinone/4,4'-dihydroxybiphenyl copolymer 11) 4-Hydroxybenzoic acid/2,6-naphthalenedicarboxylic acid/4,4'-dihydroxybiphenyl copolymer 12) 4-Hydroxybenzoic acid/terephthalic acid/2,6-naphthalenedicarboxylic acid/hydroquinone copolymer 13) 4-Hydroxybenzoic acid/2,6-naphthalenedicarboxylic acid/hydroquinone copolymer 14) 4-Hydroxybenzoic acid/2-hydroxy-6-naphthoic acid/2,6-naphthalenedicarboxylic acid/hydroquinone copolymer 15) 4-Hydroxybenzoic acid/terephthalic acid/2,6-naphthalenedicarboxylic acid/hydroquinone/4,4'-dihydroxybiphenyl copolymer 16) 4-Hydroxybenzoic acid/terephthalic acid/4-aminophenol copolymer 17) 2-Hydroxy-6-naphthoic acid/terephthalic acid/4-aminophenol copolymer 18) 4-Hydroxybenzoic acid/2-hydroxy-6-naphthoic acid/terephthalic acid/4-aminophenol copolymer 19) 4-Hydroxybenzoic acid/terephthalic acid/4,4'-dihydroxybiphenyl/4-aminophenol copolymer 20) 4-Hydroxybenzoic acid/terephthalic acid/ethylene glycol copolymer 21) 4-Hydroxybenzoic acid/terephthalic acid/4,4-dihydroxybiphenyl/ethylene glycol copolymer 22) 4-Hydroxybenzoic acid/2-hydroxy-6-naphthoic acid/terephthalic acid/ethylene glycol copolymer 23) 4-Hydroxybenzoic acid/2-hydroxy-6-naphthoic acid/terephthalic acid/4,4'-dihydroxybiphenyl/ethylene glycol copolymer 24) 4-Hydroxybenzoic acid/terephthalic acid/2,6-naphthalenedicarboxylic acid/4,4'-dihydroxybiphenyl copolymer Among the examples, the copolymers (2) and (3) are preferable, and the copolymer (3) is more preferable.

The amount of the repeating unit (1) of the liquid crystal polyester is preferably 30 mol % or greater, more preferably in a range of 30 to 80 mol %, still more preferably in a range of 30 to 70 mol %, and particularly preferably in a range of 35 to 65 mol % with respect to the total amount of all repeating units constituting the liquid crystal polyester. Further, the "total amount of all repeating units constituting the liquid crystal polyester" is a value obtained by dividing the mass of each repeating unit constituting the liquid crystal polyester by the formula amount of each repeating unit to acquire the substance equivalent (mol) of each repeating unit and summing these acquired values.

In a case where the amount of the repeating unit (1) of the liquid crystal polyester resin is 30 mol % or greater, the heat resistance and the hardness of the molded product to be obtained by using the liquid crystal polyester resin composition according to the present embodiment are likely to be improved. Further, in a case where the amount of the repeating unit (1) is 80 mol % or less, the melt viscosity can be decreased. Therefore, the temperature required for molding the liquid crystal polyester resin is likely to be lowered.

The amount of the repeating unit (2) of the liquid crystal polyester is preferably 35 mol % or less, more preferably in a range of 10 to 35 mol %, still more preferably in a range of 15 to 35 mol %, and particularly preferably in a range of 17.5 to 32.5 mol % with respect to the total amount of all repeating units constituting the liquid crystal polyester.

The amount of the repeating unit (3) of the liquid crystal polyester is preferably 35 mol % or less, more preferably in a range of 10 to 35 mol %, still more preferably in a range of 15 to 35 mol %, and particularly preferably in a range of 17.5 to 32.5 mol % with respect to the total amount of all repeating units constituting the liquid crystal polyester.

The total of the amount of the repeating unit (1) of the liquid crystal polyester, the amount of the repeating unit (2) of the liquid crystal polyester, and the amount of the repeating unit (3) of the liquid crystal polyester does not exceed 100 mol %.

The ratio between the amount of the repeating unit (2) and the amount of the repeating unit (3) of the liquid crystal polyester resin is expressed as [amount of repeating unit (2)]/[amount of repeating unit (3)] (mol/mol) and is preferably in a range of 0.9 to 1.1, more preferably in a range of 0.95 to 1.05, and still more preferably in a range of 0.98 to 1.02.

The ratio between the amount of the repeating unit (3) and the amount of the repeating unit (1) of the liquid crystal polyester resin is expressed as [amount of repeating unit (3)]/[amount of repeating unit (1)] (mol/mol) and is preferably in a range of 0.2 to 1.0, more preferably in a range of 0.25 to 0.85, and still more preferably in a range of 0.3 to 0.75.

The molar ratio y/x of the repeating unit (2) of the liquid crystal polyester resin is preferably greater than 0 and less than or equal to 1, more preferably in a range of 0.1 to 0.9, and still more preferably in a range of 0.2 to 0.8.

x represents the molar amount of a repeating unit in which $Ar^2$ represents a 1,4-phenylene group.

y represents the molar amount of a repeating unit in which $Ar^2$ represents a 1,3-phenylene group.

Further, the liquid crystal polyester resin may have only one or two or more kinds of each of independent repeating units (1) to (3). Further, the liquid crystal polyester resin may have one or two or more kinds of repeating units other than the repeating units (1) to (3), and the amount thereof is preferably 10 mol % or less and more preferably 5 mol % or less with respect to the total amount of all repeating units.

[Liquid Crystal Polyester Resin Mixture]

In the present embodiment, a liquid crystal polyester resin mixture obtained by mixing a plurality of kinds of liquid crystal polyester resins can also be used. In this manner, the melt fluidity of the liquid crystal polyester resin composition according to the present embodiment is further improved, and warpage of the molded product to be obtained can be sufficiently suppressed.

According to the embodiment of the present invention, the amount of the liquid crystal polyester resin mixture is in a range of 50% by mass to 95% by mass, preferably in a range of 55% by mass to 85% by mass, and more preferably in a range of 50% by mass to 75% by mass with respect to the total mass of the pellet mixture.

Here, a mixture of liquid crystal polyester resins having different flow start temperatures is assumed as the liquid crystal polyester resin mixture. In the liquid crystal polyester resin mixture, a liquid crystal polyester resin having a high flow start temperature is set as a first liquid crystal polyester resin and a liquid crystal polyester resin having a low flow start temperature is set as a second liquid crystal polyester resin.

The flow start temperature of the first liquid crystal polyester resin is preferably 300° C. or higher, more preferably 310° C. or higher, and still more preferably 315° C. or higher. Further, the flow start temperature of the first liquid crystal polyester resin is preferably 400° C. or lower, more preferably 360° C. or lower, and still more preferably 345° C. or lower. The upper limit and the lower limit described above can be arbitrarily combined.

For example, the flow start temperature of the first liquid crystal polyester resin is preferably in a range of 300° C. to 400° C., more preferably in a range of 310° C. to 360° C., and still more preferably in a range of 315° C. to 345° C.

In a case where the flow start temperature of the first liquid crystal polyester resin is in the above-described range, both the melt fluidity of the resin and the heat resistance of the molded product to be obtained tend to be achieved.

Meanwhile, the flow start temperature of the second liquid crystal polyester resin is preferably 260° C. or higher, more preferably 270° C. or higher, and still more preferably 285° C. or higher. Further, the flow start temperature of the second liquid crystal polyester resin is preferably 350° C. or lower, more preferably 320° C. or lower, and still more preferably 315° C. or lower. The upper limit and the lower limit described above can be arbitrarily combined.

For example, the flow start temperature of the second liquid crystal polyester resin is preferably in a range of 260° C. to 350° C., more preferably in a range of 270° C. to 320° C., and still more preferably in a range of 270° C. to 315° C.

In a case where the flow start temperature of the second liquid crystal polyester resin is in the above-described range, the fluidity of a thin portion (thin fluidity) of a mold is likely to be improved, and the deflection temperature under load of the molded product to be obtained tends to be increased.

Further, the amount of the second liquid crystal polyester resin in the liquid crystal polyester resin mixture is preferably in a range of 10 to 150 parts by mass, more preferably in a range of 30 to 120 parts by mass, and still more preferably in a range of 50 to 100 parts by mass with respect to 100 parts by mass of the first liquid crystal polyester resin.

The amount of the second liquid crystal polyester resin to the first liquid crystal polyester resin may be appropriately set such that the deflection temperature under load and the thin fluidity of the liquid crystal polyester resin mixture are desirably balanced.

The liquid crystal polyester resin mixture can contain a liquid crystal polyester resin other than the first liquid crystal polyester resin and the second liquid crystal polyester resin. In this case of the resin mixture, the resin having the highest flow start temperature may be set as the first liquid crystal polyester resin, and the resin having the lowest flow start temperature may be set as the second liquid crystal polyester resin. A liquid crystal polyester resin mixture substantially formed of the first liquid crystal polyester resin and the second liquid crystal polyester resin is suitable.

In the present specification, the "liquid crystal polyester resin mixture substantially formed of the first liquid crystal polyester resin and the second liquid crystal polyester resin" indicates that the total mass of the first liquid crystal polyester resin and the second liquid crystal polyester resin is in a range of 90% by mass to 100% by mass and preferably in a range of 95% by mass to 100% by mass with respect to the total mass of the liquid crystal polyester resin mixture.

In the liquid crystal polyester resin mixture, α/β is preferably in a range of 0.1 to 0.6 and more preferably in a range of 0.3 to 0.6.

α represents the molar ratio y/x of the first liquid crystal polyester resin.

β represents the molar ratio y/x of the second liquid crystal polyester resin.

x represents the molar amount of a repeating unit in which $Ar^2$ represents a 1,4-phenylene group.

y represents the molar amount of a repeating unit in which $Ar^2$ represents a 1,3-phenylene group.

[Method of Producing Liquid Crystal Polyester Resin]

Next, an example of a method of producing the liquid crystal polyester resin used in the present embodiment will be described.

It is preferable that the liquid crystal polyester resin according to the present embodiment is produced by performing an acylation step and a polymerization step described below.

The acylation step is a step of acylating a phenolic hydroxy group contained in a raw material monomer with a fatty acid anhydride (for example, acetic anhydride) to obtain an acylated compound.

In the polymerization step, the liquid crystal polyester resin may be obtained by carrying out polymerization such that transesterification is caused by an acyl group of an acylated compound obtained in the acylation step and a carbonyl group contained in a carboxy group of an acylated compound of an aromatic dicarboxylic acid and an aromatic hydroxycarboxylic acid.

The acylation step and the polymerization step may be performed in the presence of a heterocyclic organic base compound represented by Chemical Formula (5) below.

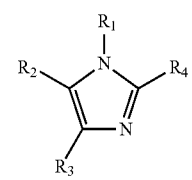

(5)

In Formula (5), $R_1$ to $R_4$ each independently represent a hydrogen atom, an alkyl group having 1 to 4 carbon atoms, a hydroxymethyl group, a cyano group, a cyanoalkyl group having an alkyl group with 1 to 4 carbon atoms, a cyanoalkoxy group having an alkoxy group with 1 to 4 carbon atoms, a carboxy group, an amino group, an aminoalkyl group having 1 to 4 carbon atoms, an aminoalkoxy group having 1 to 4 carbon atoms, a phenyl group, a benzyl group, a phenylpropyl group, or a formyl group.

As the heterocyclic organic base compound represented by Formula (5) above, an imidazole derivative in which $R_1$ represents an alkyl group having 1 to 4 carbon atoms and $R_2$ to $R_4$ each represent a hydrogen atom is preferable.

In this manner, the reactivity of the acylation reaction in the acylation step and the transesterification reaction in the polymerization reaction can be further improved. Further, the color tone of the molded product to be obtained by using the liquid crystal polyester resin composition according to the present embodiment can be further improved.

Among examples of the heterocyclic organic base compound, from the viewpoint of the availability, any one or both of 1-methylimidazole and 1-ethylimidazole are particularly preferable.

Further, it is preferable that the amount of the heterocyclic organic base compound to be used is set to be in a range of 0.005 to 1 part by mass in a case where the total amount of the raw material monomers (that is, the aromatic dicarboxylic acid, the aromatic diol, and the aromatic hydroxycarboxylic acid) of the liquid crystal polyester resin is set to 100 parts by mass. In addition, from the viewpoints of the color tone or the productivity of the molded product, it is more preferable that the amount thereof is set to be in a range of 0.05 to 0.5 parts by mass with respect to 100 parts by mass of the raw material monomers.

The heterocyclic organic base compound may be present at one time during the acylation reaction and the transesterification reaction, and the addition timing may be immediately before the start of the acylation reaction, in the middle of the acylation reaction, or between the acylation reaction and the transesterification reaction. The liquid crystal polyester resin obtained in the above-described manner has remarkably excellent melt fluidity and excellent thermal stability.

The amount of the fatty acid anhydride (such as acetic anhydride) to be used needs to be determined in consideration of the amount of the aromatic diol and the aromatic hydroxycarboxylic acid which are raw material monomers to be used. Specifically, the amount thereof is preferably in a range of 1.0 times equivalent to 1.2 times equivalent, more preferably in a range of 1.0 times equivalent to 1.15 times equivalent, still more preferably in a range of 1.03 times equivalent to 1.12 times equivalent, and particularly preferably in a range of 1.05 times equivalent to 1.1 times equivalent with respect to the total amount of the phenolic hydroxy groups contained in these raw materials monomers.

In a case where the amount of the fatty acid anhydride to be used is 1.0 times equivalent or greater with respect to the total amount of the phenolic hydroxy groups contained in the raw material monomers, the acylation reaction tends to easily proceed, unreacted raw material monomers are unlikely to remain in the subsequent polymerization step, and thus the polymerization efficiently proceeds. Further, in a case where the acylation reaction sufficiently proceeds as described above, there is little possibility that the raw material monomers which have not been acylated sublimate and a fractionator used during polymerization is blocked. Meanwhile, in a case where the amount of the fatty acid anhydride to be used is 1.2 times equivalent or less, the liquid crystal polyester resin to be obtained is unlikely to be colored.

It is preferable that the acylation reaction in the above-described acylation step is carried out in a temperature range of 130° C. to 180° C. for 30 minutes to 20 hours and more preferable that the acylation reaction is carried out in a temperature range of 140° C. to 160° C. for 1 hour to 5 hours.

The aromatic dicarboxylic acid used in the above-described polymerization step may be allowed to be present in the reaction system during the acylation step. That is, the aromatic diol, the aromatic hydroxycarboxylic acid, the aromatic dicarboxylic acid in the acylation step may be allowed to be present in the same reaction system. This is because both of the carboxy group and a substituent which may be arbitrarily substituted in the aromatic dicarboxylic acid are not affected by the fatty acid anhydride.

Therefore, a method of charging a reactor with the aromatic diol, the aromatic hydroxycarboxylic acid and the aromatic dicarboxylic acid, and sequentially performing the acylation step and the polymerization step or a method of charging a reactor with the aromatic diol and the aromatic dicarboxylic acid, performing the acylation step, further charging the reactor with the aromatic dicarboxylic acid, and then performing the polymerization step may be employed. From the viewpoint of simplifying the production steps, the former method is preferable.

It is preferable that the transesterification reaction in the polymerization step is carried out by increasing the temperature to 400° C. from 130° C. at a temperature increase rate of 0.1° C./min to 50° C./min and more preferable that the transesterification reaction is carried out by increasing the temperature to 350° C. from 150° C. at a temperature increase rate of 0.3° C./min to 5° C./min.

Further, it is preferable that fatty acids (such as acetic acid) to be generated as a by-product and unreacted fatty acid anhydride (such as acetic anhydride) are allowed to be evaporated and distilled off to the outside of the system in order to shift the equilibrium during the transesterification reaction carried out in the polymerization step. By refluxing some fatty acids to be distilled off and returning the fatty acids to the reactor at this time, the raw material monomers and the like to be evaporated and sublimate with the fatty acids can be returned to the reactor through condensation or reverse sublimation.

In the acylation reaction during the acylation step and the transesterification reaction during the polymerization step, a batch device or a continuous device may be used as the reactor. Even in a case where any of reaction devices is used, a liquid crystal polyester resin which can be used in the present embodiment is obtained.

A step for increasing the molecular weight of the liquid crystal polyester resin obtained in the polymerization step may be performed after the above-described polymerization step. For example, a powdery liquid crystal polyester resin is prepared by cooling and grinding the liquid crystal polyester resin obtained in the polymerization step. Further the molecular weight of the liquid crystal polyester resin can be increased by heating this powder.

Further, a pellet-like liquid crystal polyester resin is prepared by granulating the powdery liquid crystal polyester resin obtained by cooling and grinding the liquid crystal polyester resin. Thereafter, the molecular weight of the liquid crystal polyester resin may be increased by heating this pellet-like liquid crystal polyester resin. In the technical field, the increase in molecular weight using these methods is referred to as solid phase polymerization.

The solid phase polymerization is particularly effective as the method of increasing the molecular weight of the liquid crystal polyester resin.

A liquid crystal polyester resin having a suitable flow start temperature described below can be easily obtained by increasing the molecular weight of the liquid crystal polyester resin.

As the conditions for the solid phase polymerization reaction, a method of performing a heat treatment on the resin in a solid state for 1 to 20 hours in an inert gas atmosphere or under reduced pressure is typically employed. The polymerization conditions for this solid phase polymerization can be appropriately optimized after the flow start temperature of the resin obtained by the melt polymerization is acquired. Further, examples of the device used in the heat treatment include known dryers, reactors, inert ovens, and electric furnaces.

The flow start temperature of the liquid crystal polyester resin is preferably 270° C. or higher, more preferably in a range of 270° C. to 400° C., and still more preferably in a range of 280° C. to 380° C. In a case where the liquid crystal polyester resin having a flow start temperature in the above-described range, the heat resistance of the molded product to be obtained by using the liquid crystal polyester resin composition according to the present embodiment can be further improved. Further, in melt molding for obtaining the molded product from the liquid crystal polyester resin composition, the thermal stability of the liquid crystal polyester resin is improved so that thermal deterioration can be avoided.

Further, the flow start temperature is referred to as a flow temperature and indicates a temperature showing that the viscosity is 4800 Pa·s (48000 poise) at the time of melting the liquid crystal polyester resin and extruding the liquid crystal polyester resin from a nozzle having an inner diameter of 1 mm and a length of 10 mm while increasing the temperature at a rate of 4° C./min under a load of 9.8 MPa using a capillary type rheometer. The flow start temperature is an index indicating the molecular weight of liquid crystal polyester resin (see "Synthesis, Molding and Application of Liquid Crystalline Polymers", edited by KOIDE Naoyuki, p. 95 to 105, published by CMC Publishing CO., LTD., on Jun. 5, 1987).

The liquid crystal polyester resin having a suitable flow start temperature described above can be easily obtained by appropriately optimizing the structural unit constituting the liquid crystal polyester resin. That is, the flow start temperature of the liquid crystal polyester resin tends to be increased by improving the linearity of the molecular chain of the liquid crystals polyester resin.

For example, the structural unit derived from terephthalic acid improves the linearity of the molecular chain of the liquid crystal polyester resin. In addition, the structural unit derived from isophthalic acid improves the flexibility of the molecular chain of the liquid crystal polyester resin (degrades the linearity thereof). Therefore, the liquid crystal polyester resin having a desired flow start temperature can be obtained by controlling the copolymerization ratio between the terephthalic acid and the isophthalic acid.

In a case where the above-described liquid crystal polyester resin mixture is used, it is preferable that at least one liquid crystal polyester resin is a polymer obtained by polymerizing the raw material monomer containing the aromatic hydroxycarboxylic acid in the presence of an imidazole compound. The liquid crystal polyester resin obtained as described above has remarkably excellent fluidity at the time of melting and also has excellent thermal stability.

Further, in the liquid crystal polyester resin used in the present embodiment, it is preferable that the copolymerization ratio between the terephthalic acid and the isophthalic acid is optimized. In this manner, the linearity of the molecular chain of the liquid crystal polyester resin can be controlled as described above. As the result, a plurality of liquid crystal polyester resins with different flow start temperatures can be respectively produced.

[Inorganic Filler]

The amount of the inorganic filler in the liquid crystal polyester resin composition according to the present embodiment is preferably greater than 0 parts by mass and 100 parts by mass or less, more preferably in a range of 5 parts by mass to 100 parts by mass, still more preferably in a range of 20 parts by mass to 90 parts by mass, and particularly preferably in a range of 30 parts by mass to 90 parts by mass with respect to 100 parts by mass of the liquid crystal polyester resin.

The inorganic filler used in the present embodiment may be a fibrous filler, a plate-like filler, or a granular filler.

Examples of the fibrous filler include glass fibers; carbon fibers such as PAN-based carbon fibers and pitch-based carbon fibers; ceramic fibers such as silica fibers, alumina fibers, and silica alumina fibers; and metal fibers such as stainless fibers. Further, other examples thereof include whiskers such as potassium titanium whiskers, barium titanate whiskers, wollastonite whiskers, aluminum borate whiskers, silicon nitride whiskers, and silicon carbide whiskers. Among these, glass fibers are preferable.

Examples of the plate-like filler include talc, mica, graphite, wollastonite, glass flakes, barium sulfate, and calcium carbonate. The mica may be white mica, gold mica, fluorine phlogopite, or tetrasilicic mica. Among these, talc or mica is preferable.

Examples of the granular filler include silica, alumina, titanium oxide, glass beads, glass balloons, boron nitride, silicon carbide, and calcium carbonate.

It is preferable that the inorganic filler used in the present embodiment is at least one selected from the group consisting of glass fibers, talc, and mica.

(Glass Fibers)

Hereinafter, glass fibers serving as the fibrous filler used in the present embodiment will be described.

Examples of the glass fibers include fibers produced using various methods, such as long fiber type chopped glass fibers and short fiber type milled glass fibers. In the present embodiment, two or more of these fibers can be used in combination.

Examples of the kinds of the glass fibers include E-glass, A-glass, C-glass, D-glass, AR-glass, R-glass, S-glass, and mixtures thereof. Among these, E-glass is preferable from the viewpoints of excellent strength and availability.

As the glass fibers, weak alkaline fibers can be preferably used from the viewpoint of excellent mechanical strength (tensile strength and Izod impact strength). Particularly, glass fibers in which the amount of silicon oxide is in a range of 50% by mass to 80% by mass with respect to the total mass of the glass fibers are preferably used, and glass fibers in which the amount of silicon oxide is in a range of 65% by mass to 77% by mass with respect to the total mass of the glass fibers are more preferably used.

The glass fibers may be fibers treated with a coupling agent such as a silane-based coupling agent or a titanium-based coupling agent as necessary.

The glass fibers may be coated with a thermoplastic resin such as a urethane resin, an acrylic resin, or an ethylene/vinyl acetate copolymer and a thermosetting resin such as an epoxy resin. Further, the glass fibers may be treated with a convergence agent.

The number average fiber length of the glass fibers serving as a raw material provided for melt-kneading is preferably in a range of 50 μm to 3500 μm. In a case where the number average fiber length of the glass fibers is 50 μm or greater, the effect of the glass fibers as a reinforcing material in the molded product obtained from a pellet containing the glass fibers is further improved compared to a case where the number average fiber length thereof is less than 50 μm. The number average fiber length of the glass fibers is more preferably 60 μm or greater and more preferably 70 μm or greater.

In a case where the number average fiber length of the glass fibers is 3500 μm or less, the number average fiber length of the glass fibers in a pellet is easily adjusted so that the thin fluidity is further improved compared to a case where the number average fiber length thereof is greater than 3500 μm. The number average fiber length of the glass fibers is more preferably 3000 μm or less.

The fiber diameter (single fiber diameter) of the glass fibers serving as a raw material provided for melt-kneading is preferably in a range of 5 μm to 20 μm. In a case where the fiber diameter of the glass fibers is 5 μm or greater, the effect of reinforcing the molded product can be further increased compared to a case where the fiber diameter thereof is less than 5 μm. The fiber diameter of the glass fibers is more preferably 6 μm or greater. Further, in a case where the fiber diameter of the glass fibers is 20 μm or less, the fluidity of the liquid crystal polyester resin composition is improved and the effect of the glass fibers as a reinforcing material in the molded product is further improved compared to a case where the fiber diameter thereof is greater than 20 μm. The fiber diameter of the glass fibers is more preferably 17 μm or less and still more preferably 15 μm or less. The upper limit and the lower limit described above can be arbitrarily combined.

For example, the fiber diameter of the glass fibers is more preferably in a range of 6 μm to 17 μm and still more preferably in a range of 6 μm to 15 μm.

Further, the glass fiber diameter does not substantially change even after melt-kneading.

In the present specification, the "number average fiber length of the glass fibers serving as a raw material" indicates a value measured according to the method described in JIS R 3420 "7.8 chopped strand length" unless otherwise noted.

Further, the "fiber diameter of the glass fibers serving as a raw material" indicates a value measured according to the "A method" described in JIS R 3420 "7.6 single fiber diameter" unless otherwise noted.

The amount of the glass fibers is preferably 5 parts by mass or greater, more preferably 10 parts by mass or greater, and still more preferably 15 parts by mass or greater with respect to 100 parts by mass of the liquid crystal polyester resin. Further, the amount of the glass fibers is preferably 100 parts by mass or less, more preferably 80 parts by mass or less, and still more preferably 60 parts by mass or less with respect to 100 parts by mass of the liquid crystal polyester resin. The upper limit and the lower limit described above can be arbitrarily combined.

For example, the amount of the glass fibers is preferably in a range of 5 parts by mass to 100 parts by mass, more preferably in a range of 10 parts by mass to 80 parts by mass, and still more preferably in a range of 15 parts by mass to 60 parts by mass with respect to 100 parts by mass of the liquid crystal polyester resin.

The number average fiber length of the glass fibers in the pellet according to the present embodiment is preferably 30 μm or greater, more preferably 50 μm or greater, and still more preferably 60 μm or greater. Meanwhile, from the viewpoint of the fluidity of the liquid crystal polyester resin composition, the number average fiber length thereof is preferably 300 μm or less, more preferably 200 μm or less, and still more preferably 150 μm. The upper limit and the lower limit described above can be arbitrarily combined.

For example, the number average fiber length of the glass fibers is preferably in a range of 30 μm to 300 μm, more preferably in a range of 50 μm to 200 μm, and still more preferably in a range of 60 μm to 150 μm.

Here, the number average fiber length of the glass fibers in the pellet can be measured according to the following method. 5 g of the pellet is heated in the air of a muffle furnace at 600° C. for 8 hours to remove the resin, 500 or more strands of glass fibers are randomly selected from the remaining glass fibers using a video microscope (VH1000, manufactured by Keyence Corporation), and the fiber length of the selected glass fibers is measured at a magnification of 100 times. Here, the number average fiber length Ln can be calculated according to the following equation.

$$Ln = \Sigma(Ni \times Li)/\Sigma(Ni)$$

Li represents a measured value of the fiber length of the glass fibers. Ni represents a value obtained by dividing the number of strands of the glass fibers in which the fiber length is included in Li by the total number of strands of the measured glass fibers.

(Talc)

Hereinafter, talc serving as the plate-like filler used in the present embodiment will be described.

Talc used in the present embodiment is a ground product of a mineral formed of magnesium hydroxide and a silicate mineral. Further, the talc used in the present embodiment has a structure formed by interposing an octahedral structure formed of three magnesium (Mg) oxides and hydroxides between four tetrahedral structures formed of four silicon (Si) oxide atoms.

Examples of a method of producing talc used in the present embodiment include known production methods, for example, dry grinding methods such as a milling type grinding method using a roller mill or a Raymond mill; an impact type grinding method using an atomizer, a hammer mill, or a micron mill; and a collision type grinding method using a jet mill or a ball mill.

Further, a wet grinding method of performing grinding using a ball mill, a bead mill, a wet jet mill, or a discoplex by dispersing ground talc powder in water to obtain a slurry with a viscosity suitable for the slurry to be flowable may be used. Among examples of the production methods, from the viewpoints of low cost and availability, the dry grinding method is preferable.

The surface of the talc may be treated with a coupling agent or the like for the purpose of improving the wettability of the talc and the resin (liquid crystal polyester resin). Further, heat-treated talc may be used for the purpose of removing impurities and hardening the talc.

In addition, compressed talc may be used for the purpose of improving the handleability.

The amount of residues of talc on a 45 μm sieve is preferably 1.0% by mass or less. In a case where the amount of residues of talc on a 45 μm sieve is 1.0% by mass or less, blockage at a thin wall portion of a mold is suppressed during the molding of the pellet according to the present embodiment so that the moldability is improved. Therefore, the thin wall strength of the molded product to be obtained can be improved. The amount of residues of talc on a 45 μm sieve is preferably 0.8% by mass or less and more preferably 0.6% by mass or less with respect to the total amount of the talc.

In the present specification, the amount of residues of talc on a 45 μm sieve is set as a measured value in conformity with JIS K 5101-14-1 "pigment test method-part 14: sieve residues-section 1: wet method (manual method)".

The ignition loss (Ig. Loss) of talc is preferably 7% by mass or less, more preferably 6% by mass or less, and particularly preferably 5% by mass or less. As the Ig. Loss thereof decreases, decomposition of the liquid crystal polyester resin is suppressed and blisters are unlikely to be generated. In the present invention, the Ig. Loss is set as a measured value in conformity with JIS M 8853.

In the present embodiment, the volume average particle diameter of talc is preferably 5.0 µm or greater, more preferably 5.5 µm or greater, and still more preferably 6.0 µm or greater. Further, the volume average particle diameter thereof is preferably 25 µm or less, more preferably 24.5 µm or less, and still more preferably 24 µm or less. The upper limit and the lower limit described above can be arbitrarily combined.

For example, the volume average particle diameter of the talc is preferably in a range of 5.0 µm to 25 µm, more preferably in a range of 5.5 µm to 24.5 µm or less, and still more preferably in a range of 6.0 µm to 24 µm.

In the present embodiment, the volume average particle diameter of talc can be measured according to a laser diffraction method. The volume average particle diameter thereof can be calculated in a state in which talc is dispersed in water under the following measurement conditions using a scattering particle size distribution measuring device "LA-950V2" (manufactured by HORIBA, Ltd.).

(Measurement Conditions)
Refractive index of particles: 1.59-0.1i
Dispersion medium: water
Refractive index of dispersion medium: 1.33

In the present embodiment, the amount of talc is preferably 5 parts by mass or greater, more preferably 10 parts by mass or greater, and particularly preferably 30 parts by mass or greater with respect to 100 parts by mass of the liquid crystal polyester resin. Further, the amount of talc is preferably 100 parts by mass or less, more preferably 80 parts by mass or less, and particularly preferably 65 parts by mass or less with respect to 100 parts by mass of the liquid crystal polyester resin. The upper limit and the lower limit described above can be arbitrarily combined.

For example, the amount of the talc is preferably in a range of 5 parts by mass to 100 parts by mass, more preferably in a range of 10 parts by mass to 80 parts by mass, and particularly preferably in a range of 30 parts by mass to 65 parts by mass with respect to 100 parts by mass of the liquid crystal polyester resin.

(Mica)

Hereinafter, mica serving as a plate-like filler used in the present embodiment will be described.

Mica is a ground product of a silicate mineral containing aluminum, potassium, magnesium, sodium, iron, and the like. Further, mica is a mineral having a structure formed by interposing an octahedral structure formed of two or three metal oxides and hydroxides between four tetrahedral structures formed of three silicon (Si) atoms and one aluminum (Al) atom.

Mica used in the present embodiment may be any of muscovite, phlogopite, fluorine phlogopite, tetrasilicon mica, and artificially produced synthetic mica. The mica may contain two or more kinds thereof.

It is preferable that the mica used in the present embodiment is practically formed of only muscovite.

Examples of a method of producing the mica used in the present embodiment include a water flow type grinding method, a wet grinding method, a dry ball mill grinding method, a pressured roller mill grinding method, an air flow type jet mill grinding method, and a dry grinding method using an impact grinder such as an atomizer. From the viewpoint that the mica can be thinly and finely ground, it is preferable to use mica produced according to a wet grinding method.

In a case where a wet grinding method is performed, mica before being ground is dispersed in water. At this time, polyaluminum chloride, aluminum sulfate, ferrous sulfate, ferric sulfate, copallas chloride, polyiron sulfate, polyferric chloride, an iron-silica inorganic polymer coagulant, a ferric chloride-silica inorganic polymer coagulant, or a coagulation sedimentation agent or a sedimentation assistant such as slaked lime ($Ca(OH)_2$), caustic soda (NaOH), or soda ash ($Na_2CO_3$) is typically added for the purpose of increasing the dispersion efficiency of mica before being ground. However, these additives may cause decomposition of the liquid crystal polyester in some cases. Therefore, mica which does not use a coagulation sedimentation agent or a sedimentation assistant at the time of wet grinding is preferable as the mica used in the present embodiment.

In the presents embodiment, the volume average particle diameter of the mica is preferably 20 µm or greater, more preferably 21 µm or greater, and particularly preferably 22 µm or greater. Further, the volume average particle diameter thereof is preferably 45 µm or less, more preferably 44 µm or less, and particularly preferably 43 µm or less. The upper limit and the lower limit described above can be arbitrarily combined.

For example, the volume average particle diameter of the mica is in a range of 20 µm to 45 µm, more preferably in a range of 21 µm to 44 µm, and particularly preferably in a range of 22 µm to 43 µm.

In the present embodiment, the volume average particle diameter of the mica can be measured according to a laser diffraction method. The volume average particle diameter thereof can be calculated in a state in which mica is dispersed in water under the following measurement conditions using a scattering particle size distribution measuring device "LA-950V2" (manufactured by HORIBA, Ltd.) as a measuring device.

(Measurement Conditions)
Refractive index of particles: 1.57-0.1i
Dispersion medium: water
Refractive index of dispersion medium: 1.33

The mica with such a volume average particle diameter has improved miscibility with the liquid crystal polyester resin and is capable of further improving the fluidity of the liquid crystal polyester resin composition of the present embodiment.

The amount of the mica is preferably 5 parts by mass or greater, more preferably 10 parts by mass or greater, and still preferably 30 parts by mass or greater with respect to 100 parts by mass of the liquid crystal polyester resin. Further, the amount of the mica is preferably 100 parts by mass or less, more preferably 85 parts by mass or less, still more preferably 65 parts by mass or less, and particularly preferably 20 parts by mass or less with respect to 100 parts by mass of the liquid crystal polyester resin. The upper limit and the lower limit described above can be arbitrarily combined.

For example, the amount of the mica is preferably in a range of 5 parts by mass to 100 parts by mass, more preferably in a range of 10 parts by mass to 85 parts by mass, still more preferably in a range of 30 parts by mass to 65 parts by mass, and particularly preferably in a range of 5 parts by mass to 20 parts by mass with respect to 100 parts by mass of the liquid crystal polyester resin.

In a case where the amount of mica in the liquid crystal polyester resin composition is in the above-described range, the heat resistance of the molded product is improved and generation of blisters can be suppressed.

[Other Components]

The liquid crystal polyester resin composition may contain one or more of other components such as organic fillers, additives, and resins other than the liquid crystal polyester resin within a range where the effects of the present invention are exhibited. Hereinafter, the "resins other than the liquid crystal polyester resin" will also be referred to as "other resins".

(Organic fillers) In a case where the liquid crystal polyester resin composition according to the present embodiment contains an organic filler, the amount of the organic filler in the liquid crystal polyester resin composition is preferably greater than 0 parts by mass and 100 parts by mass or less with respect to 100 parts by mass which is the total amount of the liquid crystal polyester resin.

The organic filler used in the present embodiment may be a fibrous filler, a plate-like filler, or a granular filler.

Examples of the fibrous filler include polyester fibers, aramid fibers, and cellulose fibers. Examples of the granular filler include an insoluble and infusible polymer such as a homopolymer of parahydroxybenzoic acid.

(Additive)

In a case where the liquid crystal polyester resin composition according to the present embodiment contains an additive, the amount of the additive in the liquid crystal polyester resin composition is preferably greater than 0 parts by mass and 5 parts by mass or less with respect to 100 parts by mass which is the total amount of the liquid crystal polyester resin.

Examples of the additive include known additives in the technical field.

Examples of the known additives in the technical field include higher fatty acid esters, release agents such as metal soaps, colorants such as dyes or pigments, antioxidants, thermal stabilizers, ultraviolet absorbing agents, antistatic agents, surfactants, flame retardants, flame retardant auxiliaries, and plasticizers.

Further, additives having external lubricant effects such as higher fatty acids, higher fatty acid esters, and fluorocarbon-based surfactants are also exemplified as the additives. The kinds and the amounts of these additives to be used are determined within a range where the effects of the present invention are not impaired. The amount of the additive is preferably in a range of 0.01 to 5 parts by mass with respect to 100 parts by mass of the liquid crystal polyester resin.

(Carbon Black)

In the present embodiment, it is preferable to use carbon black as the colorant.

Examples of the carbon black used in the present embodiment include channel black type carbon black, furnace black type carbon black, lamp black type carbon black, thermal black type carbon black, ketjen black type carbon black, and naphthalene black type carbon black. Further, the liquid crystal polyester resin composition may contain two or more kinds thereof.

Among these, particularly furnace black type carbon black and lamp black type carbon black can be preferably used, and commercially available carbon black for coloring can also be used as long as the carbon black has the above-described desired characteristics. The amount of the carbon black is preferably in a range of 0.1 to 2.5 parts by mass and more preferably in a range of 0.2 to 2.0 parts by mass with respect to 100 parts by mass of the liquid crystal polyester resin.

(Release agent) According to the present embodiment, in a case where the liquid crystal polyester resin composition contains a release agent, the molding processability can be improved. Examples of the release agent include tetrafluoroethylene, montanoic acid and a salt thereof, an ester thereof, a half ester thereof, stearyl alcohol, stearamide, and polyethylene wax, and preferred examples thereof include tetrafluroethylene and a fatty acid ester of pentaerythritol.

The amount of the release agent is preferably in a range of 0.1 to 1.0 parts by mass and more preferably in a range of 0.2 to 0.7 parts by mass with respect to 100 parts by mass of the liquid crystal polyester resin. In a case where the amount of the release agent is in the above-described range, there is a tendency that mold contamination or blisters of the molded product are unlikely to be generated, and a releasing effect is obtained.

(Antioxident and Thermal Stabilizer)

According to the present embodiment, it is preferable to use hindered phenols, hydroquinones, phosphites, and substituents thereof as an antioxident or a thermal stabilizer.

(Infrared Absorbing Agent)

According to the present embodiment, it is preferable to use resorcinol, salicylate, benzotriazole, and benzophenone as an infrared absorbing agent.

Examples of other resins include thermoplastic resins other than aromatic polysulfone such as polypropylene, polyamide, polyester other than the liquid crystal polyester resin, polyphenylene sulfide, polyether sulfone, polyether ketone, polycarbonate, polyphenylene ether, and polyetherimide; and thermosetting resins such as a phenol resin, an epoxy resin, a polyimide resin, and a cyanate resin.

In a case where the liquid crystal polyester resin composition according to the present embodiment contains other resins, the amount of other resins is preferably in a range of 0 parts by mass to 20 parts by mass with respect to 100 parts by mass which is the total amount of the liquid crystal polyester resin.

<<Fine Powder>>

A fine powder used in the present embodiment is formed of an organic material. It is preferable that the organic material contains the liquid crystal polyester resin and at least one inorganic filler selected from the group consisting of glass fibers, talc, and mica.

In a case where the inorganic filler is contained as a fine powder, it is possible to prevent fusion between the pellet and the screw and to prevent adhesion of the pellet to a pellet inlet (hopper) of an injection molding machine. Therefore, the amount (feed amount) of the pellet to be supplied to the injection molding machine is stabilized, and the characteristics of the liquid crystal polyester resin composition to be obtained are further stabilized.

It is more preferable that the fine powder contains the same inorganic filler as at least one inorganic filler contained in the liquid crystal polyester resin composition and still more preferable that the fine powder has the same composition as the liquid crystal polyester resin composition described above. It is particularly preferable that the fine powder is desorbed from the pellet of the liquid crystal polyester resin composition.

From the viewpoint of appropriately adjusting slip between the pellet and the screw, the volume average particle diameter of the fine powder used in the present embodiment is in a range of 10 μm to 200 μm, preferably in a range of 20 μm to 150 μm, more preferably in a range of 30 μm to 150 μm, and particularly preferably in a range of 30 μm to 120 μm.

As the volume average particle diameter of the fine powder, a value obtained by measuring the powder separated from the pellet mixture according to the present embodiment in a state in which the fine powder is dispersed in water using a scattering particle size distribution measuring device "LA-950V2" (manufactured by HORIBA, Ltd.) is employed.

(Measurement Conditions)
Refractive index of particles: 1.81-0.1i
Dispersion medium: water
Refractive index of dispersion medium: 1.33

From the viewpoint of appropriately adjusting slip between the pellet and the screw, the amount (mass ratio) of the fine powder is in a range of 10 ppm to 2000 ppm, preferably in a range of 10 ppm to 1000 ppm, more preferably in a range of 50 ppm to 1000 ppm, and still more preferably in a range of 80 ppm to 1000 ppm with respect to the total mass of the pellet mixture according to the present embodiment.

The amount of the fine powder can be measured by measuring a specific amount of the pellet in the liquid crystal polyester resin composition, adding the pellet to a rotary, vibration type, or wind powder type fine powder sorter, sorting out the fine powder from the pellet, and measuring the mass of the fine powder.

Specifically, the amount of the fine powder contained in 5 kg of the pellet is measured using a rotary pellet sorter (rotary pellet sorter "M2 type/ST", manufactured by Takubo Machine Works Co., Ltd.) formed by setting the screen mesh size to 2 mm. The pellet is added to the sorter by dropping the pellet or fine powder adhering to the inside of a bag by blowing air thereto so that these are also added to the sorter, the fine powder is sorted out, and the mass of the sorted fine powder is measured.

For example, in a case where the measurement is performed using a 25 kg product bag which is a typical pellet product bag, the total amount of the pellet is added to the fine powder sorter from the 25 kg product bag, and the pellet and fine powder adhering to the inside of the 25 kg product bag are dropped by blowing air thereto so that these are also added to the fine powder sorter. The total amount of the added pellet is sorted into the pellet and the fine powder using the fine powder sorter.

In the present embodiment, the pellet with a small major axis and a small length (specifically, pellet having a major axis and a length of 1000 μm or less) is determined as "residues" containing the "fine powder".

Examples of a method of controlling the amount of the fine powder contained in the pellet mixture of the liquid crystal polyester resin composition according to the present embodiment to be in a specific range include a method of directly adding a specific amount of the fine powder having a specific volume average particle diameter to the pellet.

Further, examples of the method of controlling the amount of the fine powder contained in the pellet mixture of the liquid crystal polyester resin composition according to the present embodiment to be in a specific range include a method of adjusting the strand temperature for pelletizing strands extruded by melting and kneading the liquid crystal polyester resin and the inorganic filler using an extruder, a method of appropriately selecting the kind of cutter at the time of cutting strands, a method of adjusting the wind speed at the time of pneumatically transporting the pellet with or without sieving in the post step performed on the cut pellet, and a method of adjusting the shape and the size of the pellet.

In a case where the volume average particle diameter and the amount of the fine powder are adjusted according to the method of adjusting the strand temperature at the time of pelletizing strands extruded after the melt-kneading is performed using an extruder, the surface temperature of each strand is preferably in a range of 50° C. to 250° C., more preferably in a range of 70° C. to 230° C., and still more preferably in a range of 100° C. to 200° C. As the strand cutter, a drum cut type cutter or a fan cut type cutter can be used.

In a case where the amount of the fine powder is adjusted according to the method of adjusting the wind speed at the time of pneumatically transporting the pellet mixture, at the time of setting the amount of the pellet mixture to be transported per unit time as A (kg/hour) and the wind speed as B (m/second), it is preferable that the ratio of A/B is adjusted to be in a range of 5 to 20 and more preferable that the ratio thereof is adjusted to be in a range of 7 to 17.

The method of pneumatically transporting the pellet mixture is used to send the pellet mixture which has been extruded and pelletized to a product hopper for the purpose of packaging or the like and is preferable from the viewpoint that the pellet mixture can be allowed to continuously move while being produced. As a device that causes air flow for pneumatic transport, any of a suction transport type device or a pressure transport type device may be used. The wind speed B during the pneumatic transport is not particularly limited as long as the ratio of A/B is satisfied, but is preferably 15 m/sec or less and more preferably 12 m/sec or less. Here, the "wind speed" indicates the maximum wind speed in the air transport line and also indicates the wind speed measured using an air suction port in a case of using the suction transport type device, an air inlet in a case of using the pressure transport type device, and a windmill type anemometer, a cup type anemometer, an ultrasonic anemometer, a dynes type anemometer, or hot wire type anemometer which has been typically used. Further, the material of a pipe used for pneumatically transporting the pellet mixture is not particularly limited and the pipe may be made of a metal, a resin, glass, or the like.

In the pneumatic transport, an amount A of the pellet mixture to be transported per hour for sending the pellet mixture using a pneumatic transport device is preferably in a range of 100 kg/hour to 600 kg/hour and more preferably in a range of 150 kg/hour to 550 kg/hour.

In a case where the amount of the fine powder is adjusted by adjusting the shape or the size of the pellet, the shape of the pellet is preferably a cylinder, and the length of the pellet is more preferably in a range of 2 mm to 4 mm.

The length of the pellet, the major axis of the cross section of the pellet, and the minor axis thereof are acquired according to the following procedures.

100 or more pellets are arranged such that the cross section of each pellet is in a direction perpendicular to the flat plate. In a case where the shape of the cross section of each pellet is close to an ellipse, each pellet is allowed to stand such that the major axis of the cross section thereof is in a direction horizontal to the flat surface. The maximum height of the cross section of each of the arranged pellets is measured using "VR-3200 one-shot 3D shape measuring device" (manufactured by Keyence Corporation), and projected images (front projected images) of the pellets are captured in a direction perpendicular to the flat plate on which the pellets are allowed to stand and from the above of the standing pellets. The maximum height of the cross section of each pellet is set as a minor axis D2 of the cross section of the pellet.

Using the front projected images of the captured pellets, the vertical Feret diameter (a short side of a rectangle circumscribing the front projected image) and the horizontal Feret diameter (a long side of a rectangle circumscribing the front projected image) of each pellet are measured using bundled analysis software. This vertical Feret diameter is set as a major axis D1 of the cross section of each pellet. This horizontal Feret diameter is set as the length of each pellet. Further, the ratio (D1/D2) between the average major axis and the average minor axis of the cross sections of the pellets is calculated.

Examples of the method of adjusting the amount of the fine powder in terms of the composition of the pellet include a method of blending at least talc or mica. The amount of the fine powder can be increased by blending talc or mica.

As the result of intensive research conducted by the present inventors, it was found that a molded product with excellent measurement stability and an excellent color tone is obtained from the pellet mixture according to the present embodiment.

In the related art, in a case where the liquid crystal polyester resin or the pellet of the liquid crystal polyester resin composition is plasticized using an injection molding machine, a phenomenon in which the screw of the injection molding machine runs idle or a phenomenon in which the screw stops rotating may occur. As the result, the measuring time for the pellet becomes longer and variation in measuring time may occur. Further, in a case where plasticization of the pellet is unstable as described above, the thermal history of the resin changes and thus the color tone of a molded product to be obtained becomes worse.

Hereinafter, in a case where the measuring time exceeds the set cooling time without the pellets being bitten into the screw of the molding machine due to the phenomenon in which the screw runs idle or the phenomenon in which the screw stops rotating, this will be referred to as "biting failure".

Such a phenomenon is considered to occur even in a case where the friction coefficient between the pellet and the screw or between the pellet and the cylinder is extremely high or extremely low.

Further, in an injection molding machine of the related art, since a heater is provided on the outer periphery of the cylinder, a temperature gradient occurs between the screw and the cylinder in some cases. In general, it is known that the melt viscosity of the liquid crystal polyester resin composition greatly varies depending on the temperature, and a difference between the melt viscosity at a high temperature and the melt viscosity at a low temperature is large.

Therefore, the melt viscosity of the liquid crystal polyester resin composition varies between the screw and the cylinder. The pellet temperature is high and the melt viscosity is low in the vicinity of the cylinder provided with a heater. Meanwhile, the pellet temperature is low and the melt viscosity is high in the vicinity of the screw. As the result, it is considered that the biting failure occurs due to the screw running idle in the vicinity of the cylinder with a low melt viscosity, and the transport of the pellet carried out by the screw is hindered due to adhesion of the liquid crystal polyester resin composition with a high melt viscosity to the screw in the vicinity of the screw.

It is considered that since the pellet mixture according to the present embodiment contains a predetermined proportion of the fine powder having a volume average particle diameter in a predetermined range, the friction coefficient between the pellet and the screw or between the pellet and the cylinder is appropriately adjusted. As the result, it is assumed that the biting of the pellet into the screw of the injection molding machine is excellent.

Further, it is assumed that since the fine powder used in the present embodiment is melted faster than the pellet, adhesion of the liquid crystal polyester resin composition to the screw can be suppressed.

Therefore, in the pellet mixture according to the present embodiment, the biting failure is suppressed. As the result, the measuring time for the pellet becomes shorter and variation in measuring time is suppressed. Further, the thermal history of the resin becomes constant, and the color tone of the molded product to be obtained becomes excellent.

According to one aspect, it is preferable that the flow start temperature of the liquid crystal polyester constituting the fine powder is lower than the flow start temperature of the liquid crystal polyester contained in the pellet. This is because the fine powder needs to be melted faster than the pellet during the plasticization of the pellet mixture according to the present embodiment using an injection molding machine.

<<Other Components>>

The pellet mixture according to the present embodiment may contain one or more components other than the pellet and the fine powder within a range where the effects of the present invention are exhibited.

In a case where the pellet according the present embodiment contains a higher fatty acid metal salt, the molding processability can be improved. Here, the higher fatty acid indicates a fatty acid having 12 or more carbon atoms and preferably a fatty acid having 12 to 28 carbon atoms, and specific examples thereof include lauric acid, myristic acid, palmitic acid, stearic acid, oleic acid, behenic acid, and montanic acid.

Further, a higher fatty acid metal salt having a melting point of 150° C. or higher is preferable from the viewpoint of the molding processability of the liquid crystal resin composition to be obtained, and a higher fatty acid metal salt having a melting point of 200° C. or higher is more preferable as the higher fatty acid metal salt used in the present invention.

Specific examples thereof include calcium stearate, calcium laurate, calcium behenate, barium stearate, barium laurate, barium behenate, aluminum stearate, lithium stearate, potassium stearate, and sodium stearate. Among these, calcium behenate, barium stearate, barium laurate, barium behenate, lithium stearate, potassium stearate, and sodium stearate are preferable, and potassium stearate and calcium behenate are more preferable.

In the present invention, the melting point of the higher fatty acid can be measured based on the endothermic peak temperature to be observed during measurement under a condition of a temperature increase rate of 20° C./min from room temperature according to differential calorimetry.

The amount (part by mass) of the higher fatty acid metal salt is preferably in a range of 20 ppm to 1000 ppm and more preferably in a range of 100 ppm to 700 ppm with respect to the total mass of the liquid crystal polyester resin and the inorganic filler.

In a case where the amount of the higher fatty acid metal salt is 20 ppm or greater, the molding processability is further improved.

Meanwhile, in a case where the amount of the higher fatty acid metal salt is 1000 ppm or less, there is a tendency that mold contamination or blisters of the molded product are unlikely to be generated.

The present invention includes the following aspects.

<1> A pellet mixture containing a pellet of a liquid crystal polyester resin composition which contains a liquid crystal polyester resin, and glass fibers and talc as inorganic fillers; and a fine powder formed of an organic material, in which the amount of the liquid crystal polyester resin is in a range of 50% by mass to 60% by mass and more preferably 55% by mass or less with respect to the total mass of the pellet mixture, the amount of the glass fibers is preferably in a range of 10% by mass to 20% by mass and more preferably 15% by mass with respect to the total mass of the pellet mixture, the amount of the talc is in a range of 25% by mass to 35% by mass and more preferably 30% by mass with respect to the total mass of the pellet mixture, the volume average particle diameter of the fine powder is in a range of 45 μm to 110 μm, more preferably in a range of 51 μm to 106 μm, still more preferably in a range of 70 μm to 76 μm, and particularly preferably 73 μm, and the amount of the fine powder is in a range of 50 ppm to 2000 ppm with respect to the total mass of the pellet mixture.

<2> The pellet mixture according to <1>, in which the volume average particle diameter of the fine powder is in a range of 51 μm to 106 μm and more preferably 73 μm, and the amount of the fine powder is in a range of 50 ppm to 2000 ppm and more preferably 100 ppm with respect to the total mass of the pellet mixture.

<3> The pellet mixture according to <1>, further containing calcium behenate as a higher fatty acid metal salt, in which the volume average particle diameter of the fine powder is in a range of 70 μm to 76 μm and more preferably 73 μm, the amount of the fine powder is preferably in a range of 95 ppm to 105 ppm and more preferably 100 ppm, and the amount of the calcium behenate is preferably in a range of 100 ppm to 700 ppm and more preferably in a range of 200 ppm to 600 ppm with respect to the total mass of the liquid crystal polyester resin and the inorganic filler.

<4> The pellet mixture according to any one of <1> to <3>, in which the liquid crystal polyester resin is formed from a repeating unit derived from 4-hydroxybenzoic acid, a repeating unit derived from terephthalic acid, a repeating unit derived from isophthalic acid, and a repeating unit derived from 4,4'-dihydroxybiphenyl, and the number average fiber length of the glass fibers is preferably in a range of 70 μm to 80 μm and more preferably 75 μm, and the volume average particle diameter of the talc is preferably in a range of 10 μm to 20 μm and more preferably 16 μm.

<5> The pellet mixture according to any one of claims <1> to <4>, in which the flow start temperature of the liquid crystal polyester resin is in a range of 320° C. to 335° C., and more preferably 327° C.

According to the pellet mixture with the above-described configuration, a molded product with excellent measurement stability and an excellent color tone is obtained.

<Method of Producing Pellet Mixture>

Hereinafter, a method of producing the pellet mixture according to the present embodiment will be described. Further, the "pellet mixture" obtained in the process of the following production method will be described by classifying the pellet mixture into a "crude pellet" and a "purified pellet".

The "crude pellet" is obtained by melting and kneading the liquid crystal polyester resin, the inorganic filler, and other components used as necessary and indicates a pellet mixture before the amount of the fine powder is adjusted.

The "purified pellet" is obtained from the "crude pellet" and indicates a pellet mixture before the fine powder whose amount has been adjusted to a predetermined amount is added.

Further, remaining particles obtained by separating the "purified pellet" from the "crude pellet" are also referred to as "residues". A fine powder having a volume average particle diameter of 10 μm to 200 μm is contained in the "residues".

In the pellet mixture according to the present embodiment, the fine powder and the higher fatty acid metal salt to be added as necessary may be mixed with the purified pellet which has been produced in advance such that the amount of the fine powder having a volume average particle diameter of 10 μm to 200 μm is set to be in a range of 10 ppm to 2000 ppm.

First, the crude pellet is obtained by melting and kneading the liquid crystal polyester resin, the inorganic filler, and other components used as necessary using an extruder.

An extruder which has a cylinder, one or more screws disposed in the cylinder, and one or more supply ports provided in the cylinder is preferable and an extruder which further has one or more vent portions provided in the cylinder is more preferable as the extruder. A cylinder provided with a main feed port, and a side feed port on a downstream side of the main feed port in an extrusion direction is preferable as the cylinder.

Next, the purified pellet is separated from the crude pellet using a known separator.

The known separator is not particularly limited, and examples thereof include a rotary sorter and an air classification foreign substance removal device (such as Deduster, manufactured by Makino Mfg. Co., Ltd.).

Further, the purified pellet may contain a small amount of the fine powder having a volume average particle diameter of 10 μm to 200 μm. Further, the above-described separation treatment may be repeatedly performed on the purified pellet using a separator until the amount of the fine powder reaches an intended value.

The fine powder to be used may be prepared by classifying the residues obtained from the crude pellet into fine powder having a volume average particle diameter of 10 μm to 200 μm. Further, the fine powder may be prepared by classifying commercially available resin particles into the fine powder having a volume average particle diameter of 10 μm to 200 μm.

Next, the fine powder or the higher fatty acid metal salt to be added as necessary is mixed with the purified pellet using a known mixer. The known mixer is not particularly limited, and examples thereof include a tumbler mixer. In addition, the mixing order of the fine powder and the higher fatty acid metal salt to the purified pellet is not particularly limited.

Further, a pellet mixture can also be directly produced by adjusting the amount of the fine powder in the crude pellet. Examples of the method of adjusting the amount of the fine powder in the crude pellet include a method of using the Deduster. The conditions for the Deduster may be set such that the amount of the fine powder in the pellet mixture is in a range of 10 ppm to 2000 ppm by treating the crude pellet with the Deduster as a test in advance.

<Molded Product>

A molded product according to the present embodiment has the above-described pellet as a forming material.

As a method of molding the pellet, a melt molding method is preferable. Examples of the melt molding method include an injection molding method, an extrusion molding method such as a T-die method or an inflation method, a compression molding method, a blow molding method, a vacuum molding method, and press molding. Among these, the injection molding method is preferable. That is, it is preferable that the molded product according to the present embodiment is an injection molded product having the above-described pellet as a forming material.

(Applications) The molded product according to the present embodiment is suitably used for molded products required to have heat distortion resistance, such as electronic components, OA components, AV components, and heat-resistant tableware.

Examples of products and components formed of the molded product according to the present embodiment include a bobbin such as an optical pickup bobbin or a transformer bobbin; a relay component such as a relay case, a relay base, a relay sprue, or a relay armature; a connector such as RIMM, DDR, a CPU socket, S/O, DIMM, a board to board connector, an FPC connector, or a card connector; a reflector such as a lamp reflector or an LED reflector; a holder such as a lamp holder or a heater holder; a diaphragm such as a speaker diaphragm; a separation claw such as a separation claw for a copying machine or a separation claw for a printer; a camera module component; a switch component; a motor component; a sensor component; a hard disk drive component; a dish such as ovenware; a vehicle component; a battery component; an aircraft component; and a sealing member such as a sealing member for a semiconductor element or a sealing member for a coil.

EXAMPLES

Hereinafter, the present invention will be described based on examples, but the present invention is not limited to these examples. Each measurement was performed in the following manner.

<Flow Start Temperature of Liquid Crystal Polyester Resin>

The temperature showing a viscosity of 4800 Pas was measured by filling a cylinder, to which a die provided with a nozzle having an inner diameter of 1 mm and a length of 10 mm was attached, with approximately 2 g of liquid crystal polyester using a "FLOW TESTER CFT-500EX" (manufactured by Shimadzu Corporation), increasing the temperature at a rate of 4° C./min under a load of 9.8 MPa, melting the liquid crystal polyester, and extruding the liquid crystal polyester from the nozzle. The measured value was set as the flow start temperature.

<Volume Average Particle Diameter of Fine Powder>

The volume average particle diameter (m) was measured in a state in which the used fine powder was dispersed in water using a laser diffraction/scattering particle size distribution measuring device "LA-950V2" (manufactured by HORIBA, Ltd.). The measurement conditions are as follows.

(Measurement Conditions)
Refractive index of particles: 1.81-0.1i
Dispersion medium: water
Refractive index of dispersion medium: 1.33

<Amount of Fine Powder>

The amount of the fine powder (the mass ratio with respect to the total mass of the pellet) contained in 5 kg of the pellet was measured using a rotary pellet sorter (rotary pellet sorter "M2 type/ST", manufactured by Takubo Machine Works Co., Ltd.) formed by setting the screen mesh size to 2 mm. The pellet was added to the sorter by dropping the pellet or fine powder adhering to the inside of a bag used for transportation by blowing air thereto so that these were also added to the sorter, the fine powder was sorted out, and the mass of the sorted fine powder was measured.

<Production Example (Liquid Crystal Polyester Resin)>

994.5 g (7.2 mol) of 4-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid, and 1347.6 g (13.2 mol) of acetic anhydride were added to a reactor provided with a stirrer, a torque meter, a nitrogen gas introduction pipe, a thermometer, and a reflux condenser, 0.2 g of 1-methylimidazole was added thereto as a catalyst, and the inside of the reactor was sufficiently substituted with nitrogen gas.

Thereafter, the temperature of the mixture was increased from room temperature to 150° C. for 30 minutes while the mixture was stirred in a nitrogen gas flow, the same temperature was held, and the mixture was refluxed for 30 minutes.

Next, 2.4 g of 1-methylimidazole was added thereto, the temperature of the mixture was increased from 150° C. to 320° C. for 2 hours and 50 minutes while by-product acetic acid and unreacted acetic anhydride were distilled off, the temperature thereof was held to 320° for 30 minutes, and the contents were taken out and cooled to room temperature.

Solid phase polymerization was performed by grinding the obtained solid material to have a particle diameter of 0.1 to 1 mm using a grinder, increasing the temperature from room temperature to 250° C. for 1 hour in a nitrogen atmosphere, further increasing the temperature from 250° C. to 295° C. for 5 hours, and holding 295° C. for 3 hours. After the solid phase polymerization, the resultant was cooled, thereby obtaining powdery liquid crystal polyester. The flow start temperature of the obtained liquid crystal polyester resin was 327° C.

In the following examples, the following commercially available products were used as the inorganic fillers. Here, the number average fiber length is the manufacturer's nominal value.

Glass fibers: EFH75-01, manufactured by Central Glass Co., Ltd., diameter of 10 μm, number average fiber diameter of 75 μm Talc: ROSE K, manufactured by Nippon Talc Co., Ltd., volume average particle diameter of 16 μm, residues on 45 μm sieve: 0.1% by mass, Ig. Loss of 5% by mass Further, in the following examples, commercially available products were used as the higher fatty acid metal salts.

Calcium behenate: CS-7, manufactured by Nitto Chemical Industry Co., Ltd.

Hereinafter, calcium behenate will be referred to as "Ca behenate".

<Production of Pellet Mixture>

Examples 1 to 7 and Comparative Examples 1 to 4

First, each melt-kneaded material was obtained by melt-kneading the liquid crystal polyester resin and the inorganic filler at a ratio listed in Tables 1 and 2 using a twin screw extruder ("PCM-30", manufactured by Ikegai Corp.) under conditions of a cylinder temperature of 340° C. and a screw rotation number of 150 rpm. Next, the obtained melt-kneaded material was discharged in the strand form through a circular discharge port, cooled, and pelletized, thereby obtaining a crude pellet of the liquid crystal polyester resin composition.

Further, the pellet of the liquid crystal resin composition was produced while carrying out degassing with a vacuum vent provided with a twin screw extruder using a water seal type vacuum pump ("SW-25", manufactured by Shinko Seiki Co., Ltd.).

Next, a purified pellet was prepared from the obtained crude pellet by removing the fine powder contained in the crude pellet using a rotary pellet sorter (rotary pellet sorter "M2 type/ST", manufactured by Takubo Machine Works Co., Ltd.) formed by setting the screen mesh size to 2 mm.

In the present production, the operation of removing the fine powder was repeatedly performed on the crude pellet ten times, and the recovered pellet was used as the purified pellet.

In Comparative Example 1, the purified pellet was used as the pellet mixture, and the amount of the fine powder was measured. The amount of the fine powder in Comparative Example 1 was measured by repeatedly performing the operation of removing the fine powder on a part of the obtained purified pellet ten times and calculating the amount of the recovered fine powder.

<Measurement of Length of Pellet, Major Axis of Cross Section of Pellet, and Minor Axis Thereof>

The length of the pellet, the major axis of the cross section of the pellet, and the minor axis thereof were measured according to the following method.

100 of the purified pellets were arranged such that the cross section of each pellet was in a direction perpendicular to the flat plate. The pellet was fixed with double-sided tape such that the major axis of the cross section of the pellet was in a direction horizontal to the flat plate. Projected images (front projected images) of the arranged pellets were captured using "VR-3200 one-shot 3D shape measuring device" (manufactured by Keyence Corporation) in a direction perpendicular to the flat plate on which the pellets were allowed to stand and from the above of the standing pellets.

Using the front projected images of the captured pellets, the vertical Feret diameter and the horizontal Feret diameter of each pellet were measured using bundled analysis software. The average value of the horizontal Feret diameters of pellets (a long side of a rectangle circumscribing the front projected image) was calculated as the length of the pellet. Further, the average value of the vertical Feret diameters of pellets (a short side of a rectangle circumscribing the front projected image) was calculated as a major axis D1 of the cross section of the pellet. Further, the average value of the maximum heights of cross sections of the pellets was calculated as a minor axis D2 of the cross section of the pellet.

The measurement results were as follows.
Length of pellet: 3.1 mm
Major axis D1 of pellet: 2.9 mm
Minor axis D2 of pellet: 2.2 mm In addition, the fine powder having a volume average particle diameter of 51 µm, 73 µm, 90 µm, and 106 µm and particles having a volume average particle diameter of 0.1 µm and 1200 µm were respectively prepared by classifying the residues obtained from the crude pellet using a sieve.

Here, the particles indicate particles respectively prepared as particles having a volume average particle diameter of 0.1 µm and particles having a volume average particle diameter of 1200 µm by classifying the residues obtained from the crude pellet using a sieve.

The purified pellet and the fine powder or the particles, and the higher fatty acid metal salt (Ca behenate) in a case of Examples 5 to 7 were blended at the ratios listed in Tables 1 and 2 in a temperature environment of 25° C. After the blending, the mixture was mixed at a rotation speed of 30 rotation/min for 10 minutes using a tumbler mixer ("SKD-25", manufactured by PLAENG), thereby obtaining pellet mixtures of Examples 1 to 7 and Comparative Examples 2 to 4.

In Table 1, the amount (ppm) of the higher fatty acid metal salt indicates the ratio (part by mass) thereof to the total mass of the liquid crystal polyester resin and the inorganic filler.

TABLE 1

| | | Example 1 | Example 2 | Example 3 | Example 4 | Example 5 | Example 6 | Example 7 |
|---|---|---|---|---|---|---|---|---|
| Liquid crystal polyester resin (part by mass) | | 100 | 100 | 100 | 100 | 100 | 100 | 100 |
| Inorganic filler | Glass fibers (part by mass) | 27.2 | 27.2 | 27.2 | 27.2 | 27.2 | 27.2 | 27.2 |
| | Talc (part by mass) | 54.5 | 54.5 | 54.5 | 54.5 | 54.5 | 54.5 | 54.5 |
| Fine powder | Amount (ppm) | 200 | 2000 | 1000 | 50 | 100 | 100 | 100 |
| | Volume average particle diameter (µm) | 73 | 90 | 51 | 106 | 73 | 73 | 73 |
| Higher fatty acid metal salt | Ca behenate (ppm) | — | — | — | — | 200 | 400 | 600 |

TABLE 2

| | | Comparative Example 1 | Comparative Example 2 | Comparative Example 3 | Comparative Example 4 |
|---|---|---|---|---|---|
| Liquid crystal polyester resin (part by mass) | | 100 | 100 | 100 | 100 |
| Inorganic filler | Glass fibers (part by mass) | 27.2 | 27.2 | 27.2 | 27.2 |
| | Talc (part by mass) | 54.5 | 54.5 | 54.5 | 54.5 |
| Fine powder | Amount (ppm) | 6 | 5000 | — | — |
| | Volume average particle diameter (µm) | 73 | 73 | — | — |

TABLE 2-continued

|  |  | Comparative Example 1 | Comparative Example 2 | Comparative Example 3 | Comparative Example 4 |
|---|---|---|---|---|---|
| Particles | Amount (ppm) | — | — | 100 | 100 |
|  | Volume average particle diameter (μm) | — | — | 0.1 | 1200 |

<Molding of Pellet Mixture and Measurement of Measuring Time>

Tabular test pieces (length of 64 mm, width of 64 mm, and thickness of 3 mm) were molded from the pellet mixture using an injection molding machine ("ES400-5E", manufactured by Nissei Plastic Industrial Co., Ltd.) under the following conditions, the measuring times during 300 shot continuous molding were measured, and the average value (sec) and the standard deviation (sec) were acquired. The average value thereof was set as the measuring time. The standard deviation was set as the measurement variation.

(Molding conditions) Cylinder temperature: nozzle: 350° C., front portion: 350° C., central portion: 330° C., rear portion: 310° C.

Mold temperature: 130° C.
Injection speed: 75 mm/sec
Measured value: 54 mm
Suck back value: 2 mm
Screw rotation speed: 225 rpm
Pressure keeping: 10 MPa
Cooling time: 15 seconds
Back pressure: 4 MPa It was determined that the measurement stability was excellent as the measuring time became relatively shorter.

In a case where the standard deviation was 3 seconds or shorter, the stability of the measuring time was high. Further, in a case where the standard deviation was 1 second or shorter, the stability of the measuring time was higher.

<Evaluation of Biting Failure>

Pellets in which the measuring time exceeded 15 seconds which was the set cooling time of 15 seconds without being bitten into the screw of the molding machine under the injection molding conditions were regarded to have biting failure, the molding machine was temporarily stopped, the resin staying in the cylinder of the molding machine was purged once, and the test was resumed. After the start of the test, the number of shots in which the biting failure occurred for the first time was recorded, and pellets in which 300 shot continuous molding was able to be made without biting failure was noted as "none".

<Evaluation of Color Tone of Molded Product>

Using twenty tabular test pieces obtained in the examples and comparative examples, the color tone (brightness) and color unevenness of non-protruding surfaces of the tabular test pieces were visually confirmed and evaluated as A, B, and C based on the following criteria.

Here, a tabular test piece formed from only the liquid crystal polyester used as the raw material for evaluating the color tone was prepared and used as a reference of evaluation.

(Evaluation criteria) In the following evaluation criteria, the test pieces evaluated as A and B were determined to be suitably usable in this application.

A: Among the twenty tabular test pieces, test pieces had the same degree of brightness and did not have color unevenness compared to the tabular test piece formed of only the liquid crystal polyester used as the raw material.

B: Among the twenty tabular test pieces, only one to three test pieces were dark in brightness of the tabular test pieces or had color unevenness compared to the tabular test piece formed of only the liquid crystal polyester used as the raw material.

C: Among the twenty tabular test pieces, four or more test pieces were dark in brightness of the tabular test pieces or had color unevenness.

The evaluation results (the measuring time, the measurement variation, and the number of shots where the biting failure occurred for the first time) of the measurement stability of the pellet mixtures of Examples 1 to 7 and Comparative Examples 1 to 4 and the evaluation results of the color tone of the molded products are respectively listed in Tables 3 and 4.

TABLE 3

|  | Example 1 | Example 2 | Example 3 | Example 4 | Example 5 | Example 6 | Example 7 |
|---|---|---|---|---|---|---|---|
| Measuring time (sec) | 10.6 | 11.2 | 10.2 | 11.1 | 7.2 | 7.8 | 8.1 |
| Measurement variation (sec) | 1.20 | 2.60 | 0.90 | 2.10 | 0.18 | 0.14 | 0.16 |
| Number of shots in which biting failure occurred for the first time | None | None | None | None | None | None | None |
| Color tone of molded product | A | A | A | A | A | A | A |

TABLE 4

|  | Comparative Example 1 | Comparative Example 2 | Comparative Example 3 | Comparative Example 4 |
|---|---|---|---|---|
| Measuring time (sec) | 14.2 | 14.7 | 15.2 | 15.0 |
| Measurement variation (sec) | 6.80 | 8.90 | 6.80 | 7.00 |
| Number of shots in which biting failure occurred for the first time | 44 | 7 | 26 | 21 |
| Color tone of molded product | B | C | C | C |

As listed in Tables 3 and 4, in the pellet mixtures of Examples 1 to 7 to which the present invention had been applied, the average measuring time was shorter and the standard deviation was smaller compared to the pellet mixtures of Comparative Examples 1 to 4. The reason for this was assumed that the biting of the pellets into the screw of the injection molding machine was improved because each pellet mixture of Examples 1 to 7 had a predetermined proportion of the fine powder with a volume average particle diameter in a predetermined range. Actually, the biting failure did not occur during molding within the range of the present evaluation in a case of using the pellet mixtures of Examples 1 to 7. Further, it was also assumed that adhesion of the liquid crystal polyester resin to the screw was able to be suppressed.

Based on the reason described above, it can be said that the pellet mixtures of Examples 1 to 7 had excellent measurement stability.

Further, the molded products obtained by molding the pellet mixtures of Examples 1 to 7 had excellent color tones.

The reason for this was assumed that the thermal history of the resin became constant because the measurement stability of the pellet mixtures was excellent.

Particularly, it was found that the pellet mixtures of Examples 5 to 7 which contained the higher fatty acid metal salt had further improved measurement stability.

Based on the results described above, it was confirmed that the present invention is useful.

What is claimed is:

1. A pellet mixture comprising:
    a pellet of a liquid crystal polyester resin composition which contains a liquid crystal polyester resin and an inorganic filler; and
    a fine powder formed of an organic material,
    wherein the pellet has a length of 2 mm to 4 mm, a major axis of 2 mm to 4 mm, and a minor axis of 2 mm to 3 mm,
    a volume average particle diameter of the fine powder is in a range of 10 µm to 200 µm, and
    an amount of the fine powder is in a range of 10 ppm to 2000 ppm with respect to a total mass of the pellet mixture.

2. The pellet mixture according to claim 1,
    wherein the volume average particle diameter of the fine powder is in a range of 30 µm to 150 µm.

3. The pellet mixture according to claim 1,
    wherein the organic material contains a liquid crystal polyester resin and at least one inorganic filler selected from the group consisting of glass fibers, talc, and mica, and
    the liquid crystal polyester resin has the same composition as the liquid crystal polyester resin in the pellet or different composition from the liquid crystal polyester resin in the pellet.

4. The pellet mixture according to claim 1,
    wherein the organic material is the liquid crystal polyester resin composition, and
    the liquid crystal polyester resin has the same composition as the liquid crystal polyester resin in the pellet or different composition from the liquid crystal polyester resin in the pellet.

5. The pellet mixture according to claim 1,
    wherein the inorganic filler is at least one inorganic filler selected from the group consisting of glass fibers, talc, and mica.

6. The pellet mixture according to claim 1,
    wherein the amount of the fine powder is in a range of 10 ppm to 1000 ppm with respect to the total mass of the pellet mixture.

7. The pellet mixture according to claim 1,
    wherein the pellet includes a higher fatty acid metal salt in a range of 20 ppm to 1000 ppm with respect to a total mass of the liquid crystal polyester resin and the inorganic filler.

8. The pellet mixture according to claim 1,
    wherein an amount of the inorganic filler is in a range of 5 parts by mass to 100 parts by mass with respect to 100 parts by mass of the liquid crystal polyester resin.

9. An injection molded product formed from the pellet mixture according to claim 1.

10. The pellet mixture according to claim 1,
    wherein the organic material is the liquid crystal polyester resin composition, and
    the liquid crystal polyester resin has the same composition as the liquid crystal polyester resin in the pellet.

* * * * *